United States Patent [19]

Spiesser

[11] Patent Number: 5,019,732
[45] Date of Patent: May 28, 1991

[54] DISENGAGEABLE LINEAR STEPPER MOTOR WITH RECENTERED ROTOR

[75] Inventor: Gilbert Spiesser, Ales, France

[73] Assignee: Sextant Avionique, Paris, France

[21] Appl. No.: 322,430

[22] Filed: Mar. 13, 1989

[30] Foreign Application Priority Data

Mar. 14, 1988 [FR] France ............................... 88 03361
Feb. 27, 1989 [EP] European Pat. Off. ........ 89400536.2

[51] Int. Cl.$^5$ ...................... H02K 7/08; H02K 41/06
[52] U.S. Cl. .................................... 310/49 R; 310/90
[58] Field of Search ................ 310/49 R, 80, 82, 83, 310/90

[56] References Cited

U.S. PATENT DOCUMENTS 3,512,019  5/1970  Durand ............................. 310/49
4,482,828  11/1984  Vergues et al. .................. 310/83

FOREIGN PATENT DOCUMENTS 0078740  5/1983  European Pat. Off. .
1317985  1/1962  France .
2492505  10/1981  France .
1246444  9/1971  United Kingdom .

Primary Examiner—Steven L. Stephan
Assistant Examiner—Judson H. Jones
Attorney, Agent, or Firm—Stevens, Davis, Miller & Mosher

[57] ABSTRACT

A disengageable linear stepper motor is provided comprising a multipolar stator with a threaded bore, a threaded rotor rolling cycloidally inside said bore under the action of stator forces, and a drive rod fast axially with said rotor. The rod is immobilized radially in the center of said bore by bearings and resilient return means are provided for centering said rotor on said rod in the absence of stator forces, thus providing clean disengagement of the rotor, which reduces wear and noise.

7 Claims, 4 Drawing Sheets

DISENGAGEABLE LINEAR STEPPER MOTOR WITH RECENTERED ROTOR

BACKGROUND OF THE INVENTION

1. Field of the Invention

The present invention relates to an electric linear stepper motor comprising a multipolar stator with a threaded bore, a rotor having a diameter less than that of said bore, threaded to the same pitch as said bore and rolling cycloidally thereinside under the action of stator forces, and a drive rod fixed axially to said rotor and thus driven in linear translation.

Such a motor is used, for example, in precision regulation systems. In such systems, the drive rod which moves linearly and step by step, controls regulation members. It is often called control rod.

2. Description of the Prior Art

A motor of this type is already known from the European patent no. 0 078 740. The threads of the rotor are very often parallel grooves, having the same pitch as the threads of the stator, which are then helical and obtained by tapping the bore of the stator. The rotational movement of the rotor is thus transformed into a linear movement.

When the coils of the stator are energized successively, under the action of the stator forces the rotor rotates by angular steps whose number, through 360° is defined by the number of poles of the stator. Thus, an axial advance equal to the pitch of the stator corresponds to each revolution of the rotor.

When none of the coils of the stator is energized, the rotor is no longer attracted by the stator, it is in what is called a disengaged situation and may be brought back, by adapted return means, to one of the endmost positions of the range of axial positions which it may occupy relatively to the stator. This endmost position then forms its rest position.

In this type of motor, since the rotor is driven with a cycloidal movement, the drive rod or control rod is driven with a movement which causes its axis to describe a circular cylinder. Since the member to be controlled is generally not capable of adapting itself to this movement, the control rod is connected to the member to be controlled by a double articulation, or it comprises a flexible intermediate portion. These solutions have the drawbacks of lacking in precision, of being complex and expensive and, in the case where a flexible intermediate portion is used, of only allowing a single operating direction, the one for which this portion is under traction. Another drawback of this type of motor is that the disengagement is not clean and the return to the endmost position of the rotor causes a filing effect by friction of the tops of the threads of the stator against the ridges of the rotor, such friction generating wear and noise.

In a different techincal field, but closely related to the field of electric linear stepper motors, namely that of rotary electric stepper motors, numerous types of connection are known between the rotor, also driven with a cycloidal movement, and the output shaft of the motor which, for obvious reasons of convenience of use, must rotate on itself about a fixed shaft.

Thus the patent GB-A-1 246 444 describes different means for transmitting the rotational movement of the rotor to the output shaft, which means adapt themselves to the cycloidal movement of the rotor whereas the axis of the output shaft remains fixed. These means are for example universal joints, bellows or else excentric cams.

Similarly, U.S. Pat. No. 3,512,019 describes a flexible ring which transmits the movement of the rotor, whose axis here describes a cone, to the output shaft.

Furthermore, the application FR-A-2 492 605 describes resilient material disks which, in addition to their role of transmitting the movement of the rotor to the output shaft, have the function of maintaining, even at rest, a generatrix of the rotor in contact with a generatrix of the bore of the stator.

Finally, the French patent FR-A-1 317 985 describes an articulated resilient coupling which adapts itself to the cycloidal movement of the rotor, which cycloidal movement has a variable amplitude, for causing a variation of the rotational speed of the output shaft.

All these flexible or articulated connecting devices, whose function is to transmit the rotational movement of the rotor to the output shaft, must be indeformable under the action of a torsional stress, while being very deformable and very flexible under the action of a shearing stress. Their use in the linear motor of the above defined type would not overcome the drawback mentioned.

SUMMARY OF THE INVENTION

The purpose of the present invention is to overcome this drawback by providing more particularly a linear stepper motor whose disengagement is clean, so as to reduce wear and noise.

For this, it has as object a linear stepper motor of the above defined type, in which said rod is rigid and it is provided with means for immobilizing it radially in the center of said bore, as well as resilient return means for centering said rotor on said rod in the absence of stator forces.

In the motor of the present invention, as soon as energization of the stator ceases, the rotor is recentered on the drive rod by the resilient return means. Since the drive rod is rigid and itself immobilized radially in the center of the bore, the rotor is perfectly in the center of the bore, which disengages its threads cleanly from the those of the bore, and makes it possible for the rod and rotor assembly to be returned to its rest position without wear and without noise. It should be noted here that the means for resiliently returning the rotor on the rod do not have to transmit the rotational movement of the rotor to the rod, the latter being generally and in other respects immobilized in rotation on itself. No requirement is imparted thereto concerning the torsional strength. On the other hand, they must efficiently return the rotor on the rod so that the latter is perfectly centered as soon as the stator energization ceases.

In one embodiment, said rotor is a hollow cylinder having an internal diameter greater than that of said rod and through which the latter passes and said resilient return means comprise at least two rings made of a resilient material disposed at a distance from each other between said rod and said rotor.

Such an embodiment is very simple and of a low cost price.

In another embodiment, said rotor is a hollow cylinder having a diameter greater than that of said rod and through which the latter passes, and said resilient return means comprise two sleeves with axially decreasing section, mounted for sliding on said rod and returned resiliently and axially against two annular surfaces fast with both ends of said rotor.

This embodiment is particularly robust.

The sleeves may be tapered, or hemispherical. In the latter case, return of the rotor on the rod is particularly efficient, while readily allowing an excentric movement.

Advantageously, said annular surfaces are tapered.

Advantageously again, said sleeves are disposed outside said rotor and they are returned resiliently and axially by a single spring which in addition, in the absence of stator forces, returns the assembly comprising said rod and said rotor into one of the two endmost positions of its range of possible axial positions.

Thus, a construction is obtained whose operation is very reliable, and which only uses a single spring for returning the rotor to its position centered on the rod before pushing it into the rest position, these two operations being reliably effected in this order, which avoids wear and noise.

BRIEF DESCRIPTION OF THE DRAWINGS

The present invention will be better understood from the following description of two preferred embodiments of the device of the invention and variants thereof, said description being given by way of non limitative example with reference to the accompanying drawings in which.

DESCRIPTION OF THE PREFERRED EMBODIMENTS

Figure 1:
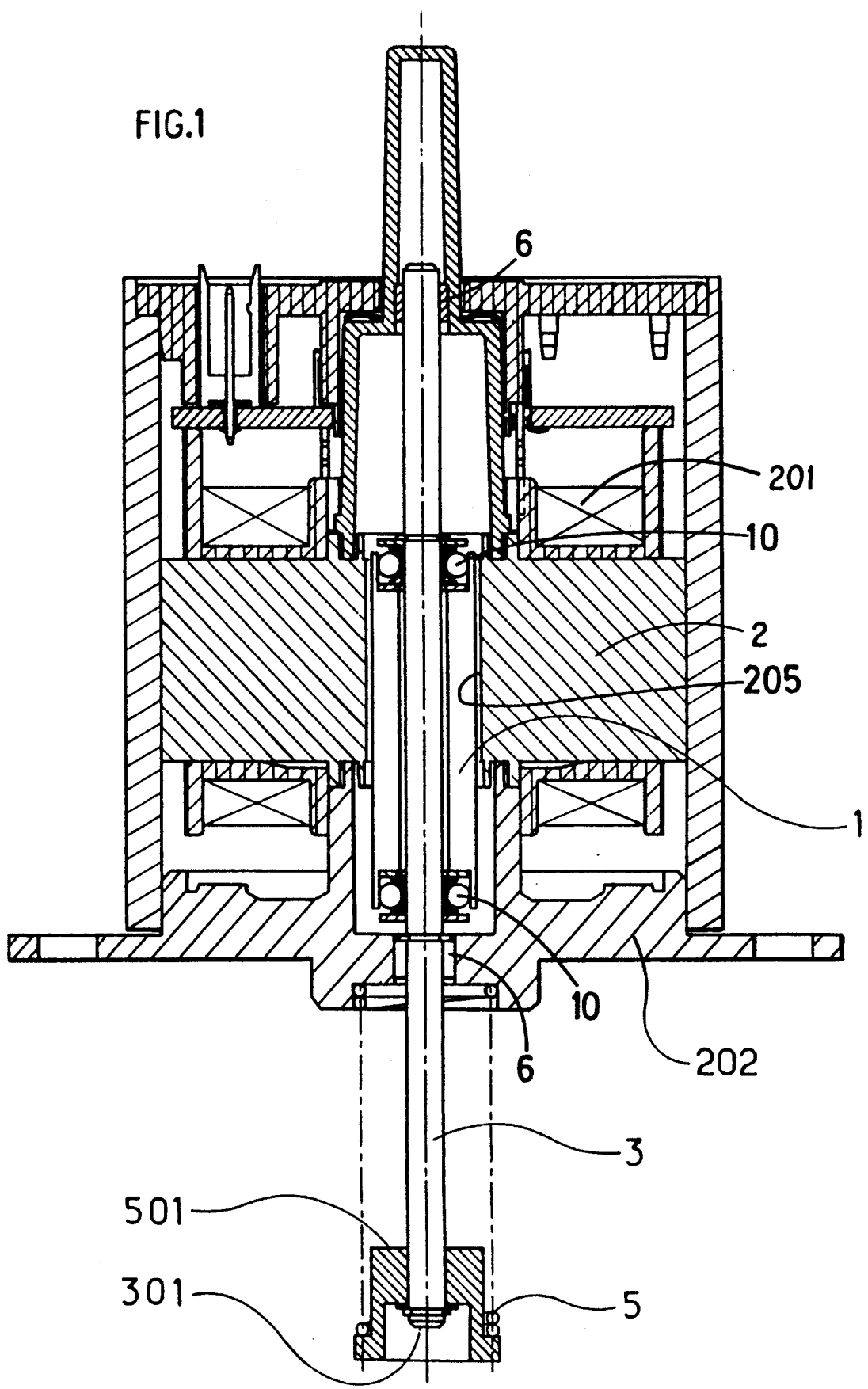
FIG. 1 shows a general sectional view of a first embodiment of the motor of the invention.
Figure 2:
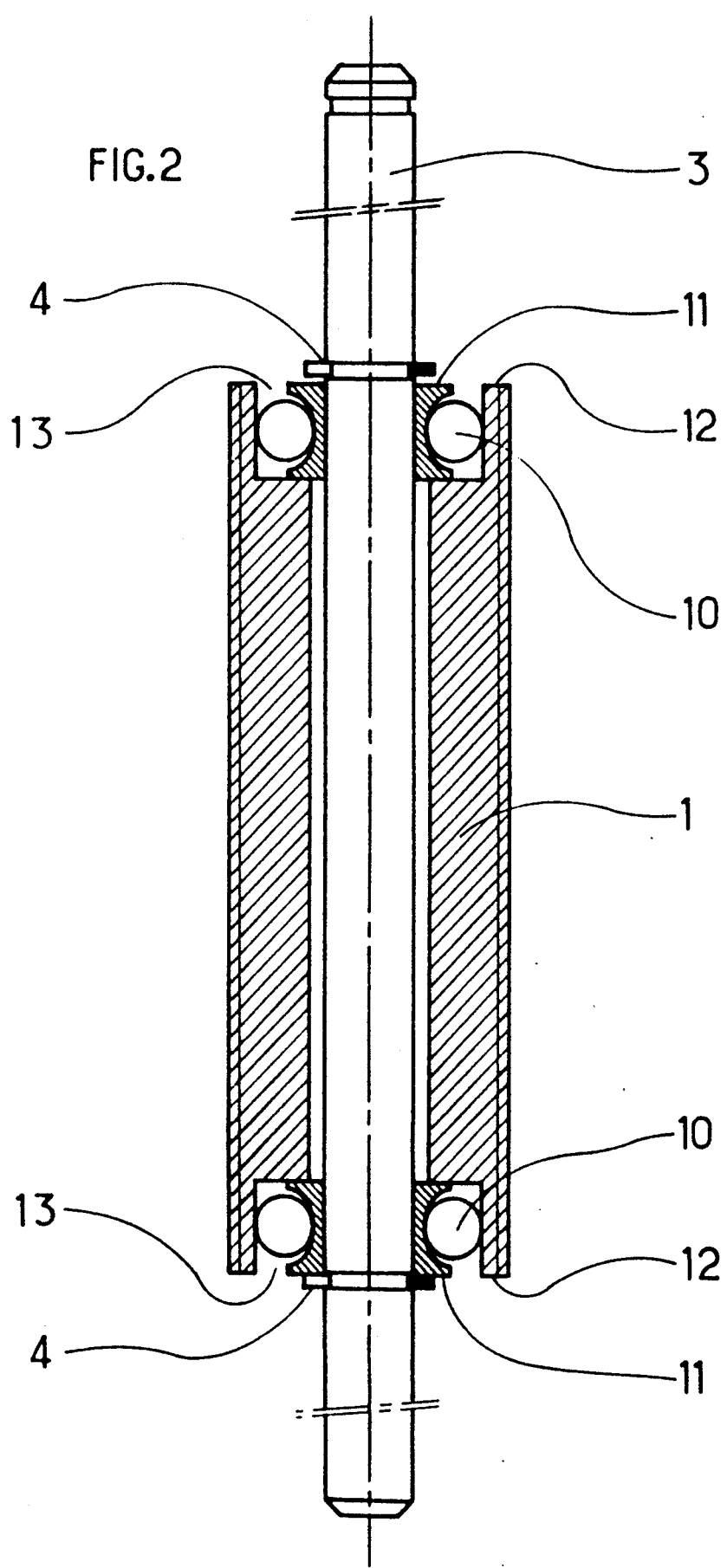
FIG. 2 shows, in section, a detailed view of the drive rod and of the rotor of the motor of FIG. 1.

With reference to FIGS. 1 and 2, a motor comprises a multiple stator 2 with a threaded bore 205, each pole being surrounded by a coil 201.

A drive rod or control rod 3 is mounted movable in translation along the axis of stator 2 and is immobilized radially in the center of the bore of stator 2 by bearings 6. A resilient return means 5, here a helical spring bearing on the flange 202 of the motor and on a cap 501 fast with the external end 301 of rod 3, tends to return rod 3 to an extended position.

A rotor 1 in the form of a hollow cylinder, threaded to the same pitch as bore 205 of the stator, is mounted coaxially about the control rod 3, its maximum external diameter being less than the minimum internal diameter of bore 205 of stator 2. The internal diameter of rotor 1 is greater than the external diameter of the control rod 3.

As shown in FIG. 2, both ends 12 of rotor 1 comprise a recess 13. In the space freed by each of the recesses is located a ring 11 with an internal diameter corresponding substantially to the external diameter of the control rod 3, and whose axial dimension is substantially equal to the depth of the recess so as to cooperate by bearing on the bottom of said recess. The external periphery of each ring 11 has a grooved profile, this groove receiving an O-ring 10 made from a resilient material whose external diameter corresponds substantially to the diameter of recess 13 and bears on the cylindrical surface thereof. The two O-rings 10 are thus disposed at a distance from each other. The thickness of each ring 11 is such that it is less than half the difference between the diameter of recess 13 and the internal diameter of rotor 1 and is greater than the difference between the internal diameter of rotor 1 and that of rod 3; thus, the rotor 1 may be driven with a radial movement with respect to rod 3 and whatever the amplitude of this movement, rings 11 cooperate by bearing at the bottom of recesses 13.

Two resilient rings 4 each snap fitted into a groove of control rod 3 cooperate on each side of the rotor 1, rings 11 and O-rings 10 assembly so as to interlock it axially with control rod 3.

In a way known per se, when the coils 201 of stator 2 are successively fed with electric power, the rotor rolls cycloidally inside the bore of the stator under the action of the stator forces. Cooperation between the threads of rotor 1 and stator 2 means that this cycloidal movement is accompanied by a relative axial displacement of rotor 1 and stator 2, which thus drives rod 3 in axial linear translation.

This cycloidal movement is accompanied by compression of the O-rings 10: when rotor 1 is attracted radially towards the energized stator pole, the portion of the O-rings 10 diametrically opposite said pole is compressed and permits rotor 1 to cooperate with the stator 2 by mutual engagement of their respective threads in the vicinity of the energized stator pole.

When the stator energization stops, rotor 1 is returned by the O-rings 10 into the position where it is centered on rod 3, and in which its axis coincides with that of the bore 205 of stator 2. The threads of rotor 1 and of bore 205 no longer cooperate. The motor is thus disengaged.

Thus, the resilient O-rings 10 return rotor 1 and center it on rod 3 in the absence of stator forces.

In the example described here, spring 5 returns the assembly comprising rod 3 and rotor 1 into their rest position, which corresponds to one of the two endmost positions of the range of possible axial positions of this assembly relatively to the stator. In this case, the rest position corresponds to that in which rod 3 is extended to a maximum from the bore of the stator. Naturally, another arrangement of spring 5 would make is possible to have a rest position corresponding to the retracted rod 3. In some applications, spring 5 may also be omitted so that the rod, in the absence of energization, remains in the position where it is at the time when energization ceases, rather than coming systematically back to the same rest position.

Figure 3:
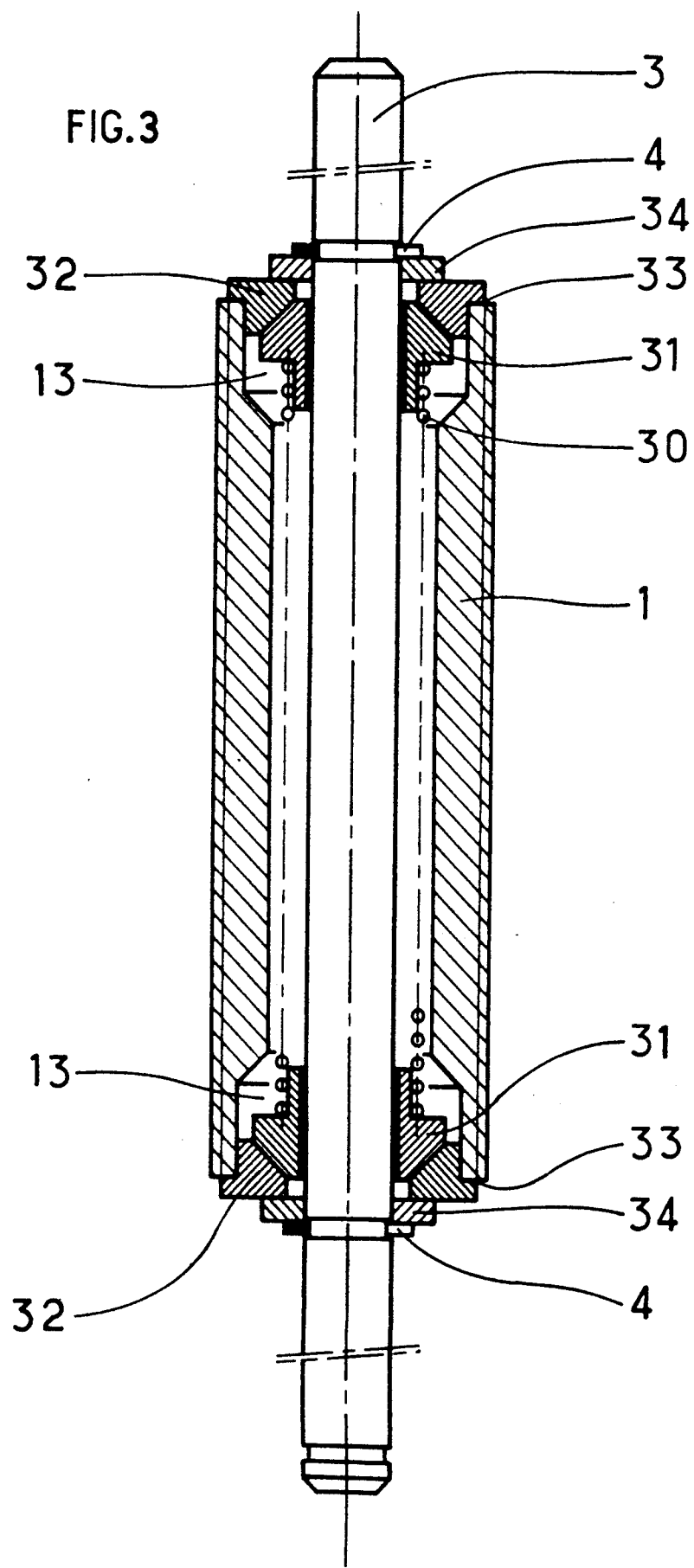
FIG. 3 shows, in section, a detailed view of the drive rod and of the rotor in a second embodiment of the motor of the invention.

In a second embodiment of the device of the invention and referring to FIG. 3, the rotor is centered with respect to the control rod 3 which passes through it by two tapered sleeves 31 mounted for sliding about the control rod 3 and joined together by a helical spring 30 mounted coaxially about the control rod 3.

Each of the two tapered sleeves 312 is thus returned resiliently and axially against an annular surface, also tapered here, of a socket 32 fast with each of the ends of rotor 1. Each socket 32 has a shoulder 33 and is fitted in each of the recesses 13.

Sleeves 31 are disposed inside rotor 1 and each socket 32 is held in abutment against each flat end of rotor 1 by a washer 34 inserted between said socket and a resilient ring 4 fast with the control rod 3. The thickness of each washer 34 is such that the rotor 1 is made longitudinally fast with rod 3.

The diameter of the bore of sockets 32 is greater than that of the control rod 3 so as to permit a radial displacement of rotor 1 causing it to cooperate with the bore of stator 2.

When rotor 1 is attracted towards one of the poles of stator 2, there is a radial displacement of rotor 1 through the tapered sleeves 31 sliding over the annular surfaces of sockets 32. The result is that sleeves 31 are drawn linearly together along the axis of rotor 1 and spring 30 is compressed.

In the absence of stator energization, the tapered sleeves 31, sliding over sockets 32 and under the action of spring 30, recenter rotor 1 about the control rod 3 and thus cause disengagement of the motor.

Figure 4:
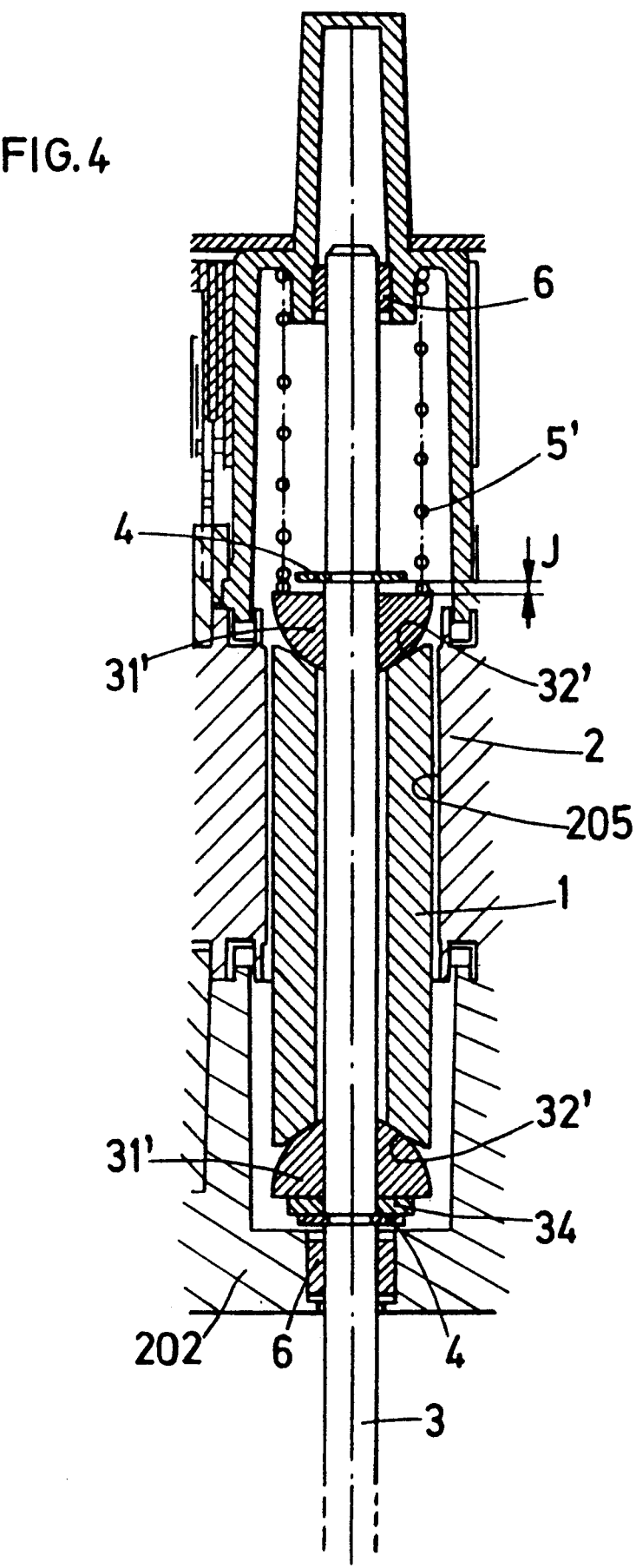
FIG. 4 shows, in section, a detailed view of the drive rod and of the rotor of a variant of construction of the motor of FIG. 3.

In FIG. 4, a modification of the assembly shown in FIG. 3 has been represented. In this case, the tapered sleeves 31 are replace by hemispherical sleeves 31' which are disposed outside rotor 1, on each side thereof. Each of sleeves 31' is returned against two annular surfaces 32', carried by the ends of rotor 1 and here tapered, by means of a helical spring 5' mounted coaxially about the upper part, in FIG. 4, of rod 3. Spring 5' bears both on the rear portion of the case of the motor, shown in the upper part of FIG. 4, and against the upper sleeve 31' in FIG. 4. Between the two resilient rings 4 which interlock rotor 1 axially with rod 3 we can see, from bottom to top of FIG. 4: a washer 34, the lower hemispherical sleeve 31', rotor 1 and the upper hemispherical sleeve 31'. When the motor is disengaged, rotor 1 is centered on rod 3 by the hemispherical sleeves 31' and a clearance J is provided between the upper hemispherical sleeve 31' and the upper ring 4. When, under the action of the stator forces, rotor 1 is attracted by one of the poles of the stator 2 and is offcentered, the lower hemisherical sleeve 31' remains in abutment against washer 34, and the upper hemispherical sleeve 31' is pushed back upwards in FIG. 4 by a distance less than the clearance J. When the stator ceases to be energized, spring 5' pushes the upper hemispherical sleeve 31' against the tapered annular surface 32' of the rotor, which results in re-centering rotor 1 on rod 3, a similar phenomenon occurring between the lower hemispherical sleeve 31' and the corresponding annular surface 32'. The threads of rotor 1 and of the bore of stator 2 are disengaged, and spring 5' then pushes the assembly comprising rod 3 and rotor 1 towards the rest position in which the rod is extended, the position shown in FIG. 4. Spring 5', in addition to its function of re-centering rotor 1, through sleeves 31', has the function of spring 5 in FIG. 1 which may, in this case, be omitted.

Naturally, the present invention is not limited to the tapered 31 or hemispherical 31' sleeves which have just been described by way of example. Thus, in order to obtain re-centering, it is sufficient for these sleeves to have an axially decreasing section, and for their small cross section ends to be returned resiliently against the annular surfaces such as 32 and 32' fast with the ends of rotor 1. It is not necessary for these annular surfaces 32 and 32' to be tapered, they may have any appropriate form promoting sliding against the sliding sleeves 31 or 31'.

What is claimed is:

1. An electric linear stepper motor comprising a multipolar stator with a threaded bore, a rotor of a diameter less than that of said bore, threaded to the same pitch as said bore and rolling cycloidally inside the latter under the action of stator forces, and a drive rod axially fast with said rotor and thus driven in linear translation, wherein said rod is rigid and the motor is provided with means for imobilizing it radially in the center of said bore, as well as resilient return means for centering said rotor on said rod in the absence of stator forces.

2. The motor as claimed in claim 1, wherein said rotor is a hollow cylinder having an internal diameter greater than that of said rod and through which the latter passes and said resilient return means comprise at least two rings made of a resilient material disposed at a distance from each other between said rod and said rotor.

3. An electric linear stepper motor comprising a multipolar stator with a threaded bore, a rotor of a diameter less than that of said bore, threaded to the same pitch as said bore and rolling cycloidally inside the latter under the action of stator forces, and a drive rod axially fast with said rotor and thus driven in linear translation, wherein said rod is rigid and the motor is provided with means for immobilizing it radially in the center of said bore, as well as resilient return means for centering said rotor on said rod in the absence of stator forces, wherein said rotor is a hollow cylinder having a diameter greater than that of said rod and through which the latter passes, and said resilient return means comprise two sleeves with axially decreasing section, mounted for sliding on said rod and returned resiliently and axially against two annular surfaces fast with both ends of said rotor.

4. The motor as claimed in claim 3, wherein said sleeves are tapered.

5. The motor as claimed in claim 3, wherein said sleeves are hemispherical.

6. The motor as claimed in claim 3, wherein said annular surfaces are tapered.

7. The motor as claimed in claim 3, wherein said sleeves are disposed outside said rotor and they are returned resiliently and axially by a single spring which, in the absence of stator forces, in addition returns the assembly comprising said rod and said rotor into one of the two endmost positions of its range of possible axial positions.

* * * * *